United States Patent [19]

Nappen

[11] 4,272,557

[45] Jun. 9, 1981

[54] STABLE GELATIN DESSERT AND PROCESS FOR MAKING SAME

[75] Inventor: Bernard H. Nappen, Cranford, N.J.

[73] Assignee: National Starch and Chemical Corporation, Bridgewater, N.J.

[21] Appl. No.: 101,781

[22] Filed: Dec. 10, 1979

[51] Int. Cl.³ .............................................. A23L 1/06
[52] U.S. Cl. ..................................... 426/576; 426/573
[58] Field of Search ............... 426/573, 576, 578, 579, 426/661

[56] References Cited

U.S. PATENT DOCUMENTS

| 3,471,301 | 10/1969 | Mitchell | 426/576 |
|---|---|---|---|
| 3,917,875 | 11/1975 | Gardiner | 426/576 |
| 3,930,052 | 12/1975 | DeBrou et al. | 426/576 |
| 3,940,505 | 2/1976 | Nappen | 426/661 |
| 3,996,390 | 12/1976 | Igoe | 426/573 |

OTHER PUBLICATIONS

Goldfrank; H., Chemurgic Digest "Guar: A Plant Gum With Many Uses", Jul., p. 10, 1960.

Primary Examiner—Jeanette M. Hunter
Attorney, Agent, or Firm—Edwin M. Szala; Janet E. Hasak

[57] ABSTRACT

A gelatin dessert prepared from a dessert powder containing gelatin, sugar and optionally flavor and color is improved by adding to the powder from about 0.5 to 5%, by weight, of guar gum, based on the weight of the powder. The guar gum imparts low-temperature stable properties to the gelatin dessert without substantially adversely affecting the physical appearance and texture thereof.

6 Claims, No Drawings

STABLE GELATIN DESSERT AND PROCESS FOR MAKING SAME

BACKGROUND OF THE INVENTION

This invention relates to a gelatin dessert powder which, when incorporated into a gelatin dessert, provides the dessert with low-temperature stability.

One of the most important uses of gelatin in the food industry today is in the manufacture of gelatin desserts, which are prepared from gelatin dessert powders typically composed of gelatin, sugar, an edible organic acid, flavor and color. In the standard preparation of such desserts, the gelatin powder is dissolved in hot water and the mixture is then cooled by adding cold water and allowing to stand in a refrigerator, whereupon a translucent gel is formed. Much of the use of gelatin desserts today is in institutional programs such as school lunches and hospital meals. Because of the uncertainty in the production and supply of institutional foods, the meals prepared therefrom are now usually stored in a freezer. Gelatin desserts, however, cannot tolerate the freeze-thaw cycles which are undergone when the gelatin is thawed before use or when the storage temperature fluctuates, and consequently break down through syneresis, losing their acceptable texture, set and mouthfeel. The gelatin desserts must therefore be prepared and stored separately from the main meal.

It is an object of the present invention to provide a gelatin dessert powder which will produce a gelatin dessert exhibiting low-temperature stability.

It is another object to provide a process for preparing low-temperature stable gelatin desserts which substantially retain their desirable physical properties and appearance.

SUMMARY OF THE INVENTION

The above and related objects are achieved in an improved gelatin powder of the type containing gelatin, sugar, and optionally flavor and color, the improvement which comprises the presence of about 0.5 to 5% by weight of guar gum, based on the weight of the powder. The guar gum-containing powder provides the finished gelatin dessert with low-temperature stability, while not substantially altering the physical properties, e.g., clarity and set, of the dessert. The dessert product can thus be prepared and frozen with the main meal for institutional uses with succesful results.

Guar gum has bee known for its use as a thickener and stabilizer for many foods such as ice cream, cheeses and salad dressing; however, it is unexpected that guar gum will impart low-temperature stability to a gelatin dessert while not producing an undesirable cloudy product or reacting with the gelatin, as do many other known stabilizers such as food starches and various other gums.

DESCRIPTION OF THE PREPARED EMBODIMENTS

A typical gelatin dessert powder is prepared by blending finely ground gelatin, usually of high gel strength, with sugar, a flavoring agent and a coloring agent. For purposes of achieving clarity in the final product, it is desirable to employ the clearest gelatins having a low lime content. The proper amount of gelatin to be used varies with the Bloom value thereof and the dilution factor in the final product. Ordinarily, the gelatin powder will constitute at least 20% by weight of the dry dessert powder, and usually no more than 90% by weight. The amount of sugar employed depends on the degree of sweetness desired, but generally as sugar concentration increases, the amount of time for setting decreases. The other ingredients which are preferably added to the powder and the amounts thereof are well known in the food industry. Additional optional ingredients include a water-soluble sulfate to increase the rate of gelation and an edible organic acid such as citric or tartaric acid to provide a degree of tartness in the dessert. To enhance the flavor of the gelatin dessert, powdered or flaked fruit may also be added to the dessert powder, such as the drum-dried mixture of starch and fruit disclosed in U.S. Pat. No. 3,940,505.

According to the invention herein, guar gum is blended with the other ingredients of the dessert powder in any order, and in an amount which may range from about 0.5 to 5% by weight of the powder, depending on the setting properties desired in the gelatin dessert and on whether fruit particles are to be dispersed, in which a larger amount is added. It will be recognized by the practitioner that amounts of guar gum which are too low will not be effective in imparting the desired properties to the dessert, while amounts much higher than 5% will result in precipitation or cloudiness in the dessert. The preferred amount of guar gum employed is 1 to 3% by weight.

In the preparation of the gelatin dessert, the standard technique is followed whereby initially the gelatin or complete dessert powder is dissolved in warm or boiling water, accompanied by stirring to achieve dissolution. The remainder of the ingredients of the powder are added at this point, if not already added, followed by the addition of cold water. The amount of total water added depends on the type of gelatin powder employed but ordinarily is such as to be four to ten times the weight of the dessert powder. The resulting mixture is allowed to set at refrigeration temperature until a gel is formed. Fruit pieces derived from fresh or canned fruit (such as fruit cocktail) may be optionally added to the gelatin mixture prior to the setting of the dessert.

The gelatin dessert obtained using the powder of this invention successfully withstands break-down caused by syneresis from freeze-thaw cycles, while essentially retaining the taste, mouthfeel, texture, color and clarity of a gelatin dessert which does not contain any stabilizer. In addition, the dessert remains as a gel at room temperature overnight, whereas standard gelatin desserts break down at room temperature in a few hours.

The examples which follow illustrate the embodiments of the invention. In every example, all parts and percentages are given by weight and all temperatures in degrees Celsius unless otherwise noted.

EXAMPLE I

Five gelatin dessert powders were prepared using 7.2 g of unflavored powdered gelatin, 56.5 g of sugar, 1.3 g of a drum-dried mixture of 30 parts lemon and 70 parts starch as described in U.S. Pat. No. 3,940,505, and one of the gums in the amount indicated in Table I.

TABLE I

| Gum (g): | Control | Sample A | B | C* | D* | E* |
|---|---|---|---|---|---|---|
| Guar gum | — | 2.0 | 2.5 | — | — | — |
| Xanthan gum | — | — | — | 3.0 | — | 1.25 |

TABLE I-continued

| Gum (g): | Control | Sample A | B | C* | D* | E* |
|---|---|---|---|---|---|---|
| Locust bean gum | — | — | — | — | 2.5 | 1.25 |

*Comparative examples.

In the preparation of the gelatin dessert, 338 g of water at ambient temperature were placed in a saucepan and the gelatin was added thereto. The water and gelatin were stirred at low heat until the gelatin dissolved. The mixture was taken off the heat, and the remainder of the ingredients were added with stirring until the sugar dissolved. The mixture was thereafter chilled for 24 hours.

Samples A and B gelled with a slight cloudiness as compared to the control, but with a heavier set. The drum-dried fruit mixture remained dispersed throughout Samples A and B with little or no settling. When Samples A, B and D were prepared in a separate experiment without chilling thereof, Samples A and B remained stable at room temperature without breaking down (with no visible separation of the liquid phase), whereas D broke down in two hours. When Samples A, B and D were frozen for 12 to 24 hours and subsequently thawed, the gel structures of Samples A and B were completely intact, giving excellent low-temperature stability, but comparative Sample D had only moderate low-temperature stability.

Comparative Sample C did not gel or set up at all and thus was not evaluated for low-temperature stability. Comparative Sample E gelled, but the fruit particles settled to the bottom. When frozen and thawed under the same conditions as those employed for the samples above, Sample E retained its gel structure but was cloudy and had only moderate low-temperature stability.

EXAMPLE II

Several gelatin dessert powders were prepared by mixing the indicated ingredients in amounts of 0.5, 1.5 and 3.0%, respectively, based on the dry powder, with 1.7 g of a drum-dried mixture of orange and starch (prepared as described in U.S. Pat. No. 3,940,505) and with 85 g of a commercial gelatin powder (Jello, trademark of General Foods), containing sugar, gelatin, peach flavor and color. This mixture was then added to 225 g of boiling water and mixed until dissolved. Thereafter 225 g of cold water was added and the mixture chilled for 24 hours. Each dessert was subjected to two freeze-thaw cycles. The results are given in Table II.

TABLE II

| Polysaccharide added: | Results |
|---|---|
| Control (contains modified food starch from the mixture of fruit and starch)* | Product had moderate low-temperature stability but was cloudy; fruit pieces settled to bottom. |
| Locust bean gum* | Product had moderate low-temperature stability but was cloudy; fruit pieces settled to bottom. |
| Xanthan gum* | No set in dessert, precipitate formed. |
| Carrogeenan* | No set in dessert, precipitate formed. |
| Locust bean-xanthan gum (1:1 ratio)* | Product had moderate low-temperature stability but was cloudy; fruit pieces settled to bottom. |
| Guar gum | Product was low-temperature stable (i.e., had excellent low-temperature stability) and had a very slightly cloudy color. At 0.5% concentration, the fruit pieces settled to bottom; at 1.5% and 3% levels, the fruit pieces were suspended in the dessert. |

*These are comparative examples.

The results indicate that of all the known stabilizers tested, only guar gum was effective as a low-temperature stabilizer for gelatin desserts without substantially adversely affecting the clarity and other desirable properties of the gelatin. It is noteworthy that the sample size herein (over one pound) is larger than the typical serving portion found in institutional meals. Thus, individual servings should be able to withstand a greater number of freeze-thaw cycles since freezing and thawing time will be shorter and less abusive.

In summary, it is seen that the present invention provides gelatin desserts with low-temperature stability without substantially altering their physical properties.

Now that the preferred embodiments of the invention have been described in detail, various modifications and improvements thereof will become readily apparent to those skilled in the art. Accordingly, the spirit and scope of the invention are to be limited by the appended claims, and not by the foregoing specification.

What is claimed is:

1. In a gelatin dessert of the type prepared by dissolving a dessert powder consisting essentially of powdered gelatin, sugar, and optionally flavor and color in warm or boiling water with stirring, adding cold water and allowing the resulting mixture to set at refrigeration temperature until a gel is formed, the improvement which consists essentially of the presence in said dessert powder of about 0.5 to 5% by weight of guar gum, based on the weight of the powder, thereby providing said gelatin dessert with low-temperature stability.

2. The gelatin dessert of claim 1 wherein the amount of guar gum is 1 to 3% by weight, based on the powder.

3. The gelatin dessert of claim 1 further comprising a drum-dried mixture of fruit and starch.

4. In an improved process for producing gelatin desserts wherein a dessert powder consisting essentially of powdered gelatin, sugar, and optionally flavor and color is dissolved in warm or boiling water with stirring, cold water is added, and the resulting mixture is allowed to set at refrigeration temperature until a gel is formed, the improvement which consists essentially of adding to said dessert powder from about 0.5 to 5% by weight of guar gum, based on the weight of the powder, thereby providing said gelatin dessert with low-temperature stability.

5. The process of claim 4 wherein the amount of guar gum added is 1 to 3% by weight, based on the powder.

6. The process of claim 4 further comprising adding to said powder a drum-dried mixture of fruit and starch.

* * * * *